(No Model.)

W. C. DALBEY.
MACHINE FOR TRIMMING ELECTROTYPE PLATES AND BLOCKS.

No. 594,985. Patented Dec. 7, 1897.

WITNESSES:
C. Nordfors.
C. Geist

INVENTOR
William C Dalbey
BY
Edgar Tate & Co.
ATTORNEYS.

THE NORRIS PETERS CO., PHOTO-LITHO., WASHINGTON, D. C.

UNITED STATES PATENT OFFICE.

WILLIAM CURTIS DALBEY, OF BATTLE CREEK, MICHIGAN.

MACHINE FOR TRIMMING ELECTROTYPE PLATES AND BLOCKS.

SPECIFICATION forming part of Letters Patent No. 594,985, dated December 7, 1897.

Application filed June 28, 1897. Serial No. 642,727. (No model.)

*To all whom it may concern:*

Be it known that I, WILLIAM CURTIS DALBEY, a citizen of the United States, residing at Battle Creek, in the county of Calhoun and State of Michigan, have invented certain new and useful Improvements in Machines for Trimming Electrotype Plates and Blocks, of which the following is a full and complete specification, such as will enable those skilled in the art to which it appertains to make and use the same.

This invention relates to machines for trimming electrotype plates and blocks; and the object thereof is to provide an improved machine for this purpose which is simple in construction and operation and which is also comparatively inexpensive.

The invention is fully disclosed in the following specification, of which the accompanying drawings form a part, in which—

Figure 1:
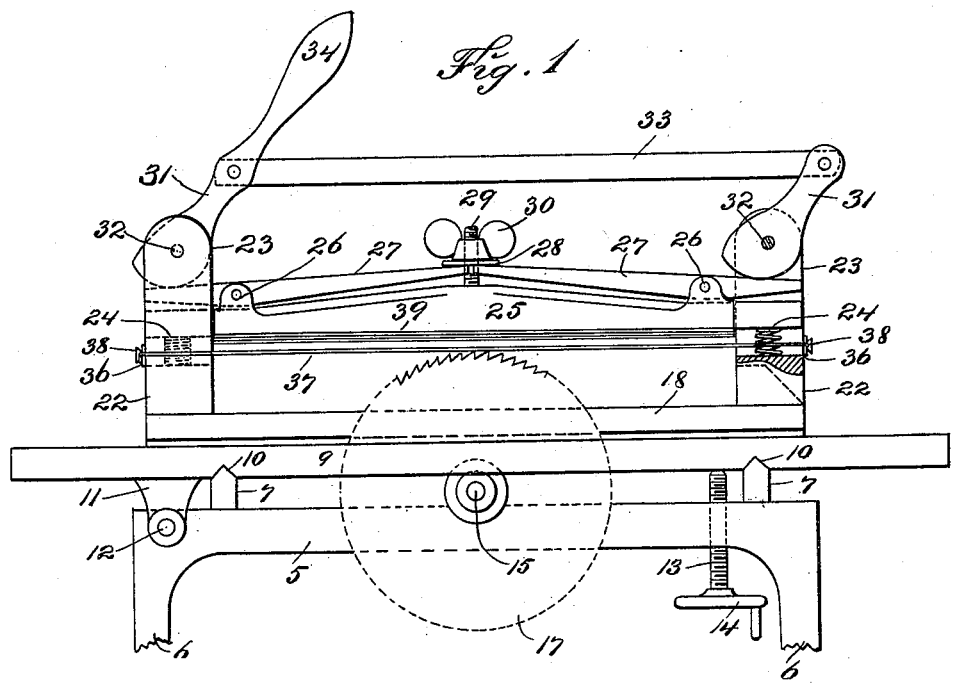
Figure 2:
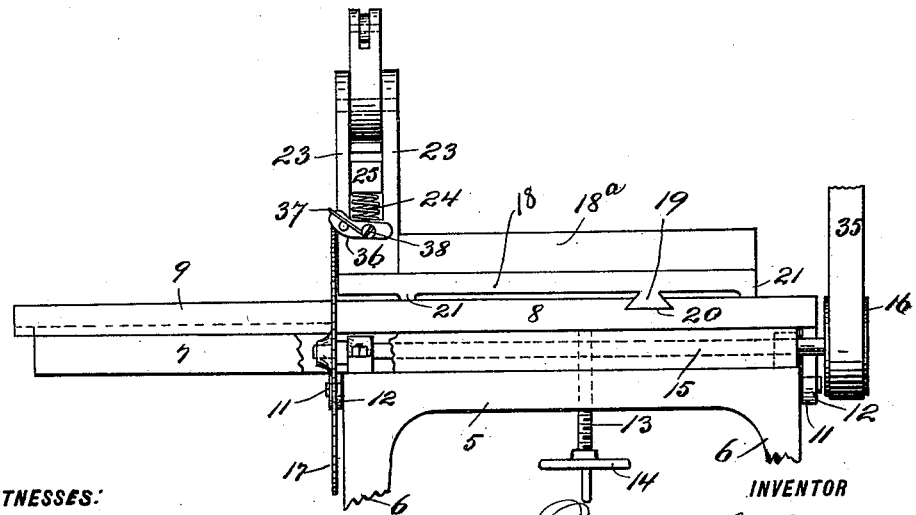

Figure 1 is a front view of my improved machine, and Fig. 2 a side view thereof.

In the drawings forming part of this specification the separate parts of my improvement are designated by the same numerals of reference in each of the views; and in the practice of my invention I provide a machine for the purpose herein specified which consists of a base-plate 5, which is supported by legs 6, and I also provide a plate 8, to the under side of which are secured transverse bars 7, and said bars 7 extend outwardly in front of the plate 5, as shown in Fig. 2, and the upper surfaces thereof are triangular in cross-section, and said bars 7 rest on the base-plate 5, and a supplemental plate 9 is mounted in front of the plate 8 on the forwardly-directed extension of said bars, and which is provided on its under surface with transverse grooves 10, which correspond in form with the upper sides of said bars, and said supplemental plate 9 is adapted to slide on the forwardly-directed extensions of the bars 7.

The plate 8 is provided at or near one end with hangers 11, which are pivotally connected with the sides of the base-plate 5, as shown at 12, and passing centrally through the opposite end of the base-plate 5 is a screw-threaded shaft 13, on the lower end of which is a crank-wheel 14, and by turning said crank-wheel 14 the free end of the plate 8 may be raised and lowered, and mounted centrally of the top of the base-plate 5 is a shaft 15, on one end of which is a pulley or belt wheel 16, and mounted on the opposite end of said shaft is a circular saw 17, and said saw is adapted to move or operate between the plates 8 and 9.

Mounted on the plate 8 is a frame consisting of a bottom plate 18, which is provided near its rear side with a downwardly-directed longitudinal tongue - and - groove flange 19, which fits in a corresponding groove 20 in the plate 8, and the bottom plate 18 of said frame is also provided with two downwardly-directed longitudinal ribs 21, which support the same at a slight distance above the plate 8, so as to decrease the friction and allow said frame to move easily on said plate, and said bottom plate 18 of said frame is provided, adjacent to the front side thereof, at each end with standards 22, which are provided with upwardly-directed jaws 23, between which are mounted expansive springs 24, and above said springs is placed a vertically-movable cross-head 25, the ends of which project between the jaws 23 of the standards 22, and pivotally connected with said cross-head, near the opposite ends thereof, as shown at 26, are levers 27, the outer ends of which also pass between said jaws and are slightly wedge-shaped in form, while the inner ends thereof are held beneath a disk or plate 28, mounted on a screw-threaded bolt 29, which is secured to the cross-head 25, centrally thereof, and above said disk or plate is a thumb-nut 30.

The frame 18 has along one side thereof a partition 18ª, which is designed to act as a guide to facilitate the proper adjustment of the electrotype plate and block upon said frame.

Mounted between the jaws 23 of each of the standards 22 is a lever 31, the lower ends of which are cam-shaped in form on their lower sides, and said ends of said levers are pivotally connected with said jaws by means of a shaft or bolt 32, and pivotally connected with each of said levers is a rod or bar 33, and one of said levers is provided with an extension or arm 34, and by moving said extension or arm 34 outwardly the cam-shaped heads of the levers 31 will be forced downwardly on the outer ends of the levers 27, and the pressure thus produced will be applied to the cross-head 25, and said cross-head 25 will be forced downwardly, and by moving said arm or extension 34 inwardly this pressure on the outer ends of the levers 27 will be released, as will be readily understood, and the amount of pressure applied to the cross-head 25 may be regulated by means of the thumb-nut 30, as will also be apparent.

The machine is operated by a driving-belt or similar device 35, which is applied to the pulley or belt wheel 16, and I also secure to the outer sides of the standards 22 arms 36, and these arms are provided with outwardly-directed extensions, and connected therewith is a wire 37, the ends of which are secured to screws 38, whereby said wire may be tightened. The wire 37 extends parallel with the plate 18 and acts as a gage to facilitate the adjustment of the electrotype-plate and its block in relation to the saw. In the practice of my invention said plate and blocks are placed on the plate 18 of the frame, partly beneath the vertically-movable cross-head 25 and secured in position thereby. Said plate 18 and its burden are then moved forward until the edge of the electrotype-plate is in the same vertical plane as the wire 37, which relative position of parts will bring that portion of the block to be sawed off in the proper position to the saw 17. It will be readily observed that by this construction the various parts may be speedily and accurately brought into the proper relative position. It is also frequently necessary to raise the frame with which the cross-head 25 is connected, especially when the electrotype plates and blocks to be trimmed are quite thin, in order that the saw 17 may work more advantageously, and this is accomplished by means of the bolt 13, which presses on the under side of the free end of the plate 8 with which said frame is connected, the raising of said free end of said plate being all that is necessary, and it will also be observed that the under side of the cross-head 25 is provided with a bearing 39, composed of rubber, leather, or similar material, the object of which is to prevent injury to the electrotype-plate on which the cross-head 25 bears in the operation of the machine, it being understood that in placing the electrotype plate and block in position, as hereinbefore described, to be operated upon by the saw the said cross-head is first raised and afterward depressed, so as to bear thereon and hold said plate or block in position while the saw operates.

The supplemental plate 9 and the outwardly-directed extensions of the bar 7 do not form essential features of my invention, but I preferably employ them so that the machine may be converted into an ordinary saw-table by placing the plates 8 and 9 into close juxtaposition and removing the sliding frame 18 from the plate 8. When the machine is employed in trimming electrotype-blocks, the plate 9 is preferably slid outwardly on its supports in order to permit the fragments removed from the block to drop into any receptacle placed under the edge of the plate 8 to receive them.

My improved machine is simple in construction and operation, and it will be apparent that changes in and modifications of the construction described may be made without departing from the spirit of my invention or sacrificing its advantages.

Having fully described my invention, I claim as new and desire to secure by Letters Patent—

1. In a machine for trimming electrotype plates and blocks, the combination with a suitable base-plate, of a frame-supporting plate, a frame mounted on the said plate and adapted to slide thereon, standards on said frame, a vertically-movable cross-head, cams for depressing said cross-head, means for operating said cams, and means attached to said cross-head whereby the degree of pressure exerted by said cams may be regulated, a shaft mounted in bearings on said base-plate and a saw rigidly mounted thereon, substantially as described.

2. A machine for trimming electrotype plates and blocks, said machine consisting of a suitably-supported base-plate, a frame-supporting plate mounted thereon, a frame mounted on the said last-named plate and adapted to slide thereon, a shaft supported centrally and transversely of the base-plate, a saw connected therewith at one end, upwardly-directed standards connected with said frame at the front side thereof adjacent to said saw, a vertically-movable cross-head mounted in said standards, and means for depressing said cross-head, consisting of levers pivotally connected with said standards, and the lower ends of which are provided with cam-heads, said levers being connected at their upper ends by a cross rod or bar, and levers pivotally connected with said cross-head near the opposite ends thereof, the outer ends of which extend beneath said cam-heads, and the inner ends of which bear upon the under side of a plate mounted on a bolt secured to said cross-head, said bolt being provided above said plate with a thumb-nut, substantially as shown and described.

3. A machine for trimming electrotype plates and blocks, consisting of a suitably-supported base-plate, a shaft mounted transversely of the top thereof and provided at one end with a circular saw, cross-bars mounted on said base-plate, a frame-supporting plate mounted on said cross-bars, a frame mounted on said last-named plate and adapted to slide thereon, said frame being provided at the opposite ends of the front thereof with upwardly-directed standards, a spring-supported vertically-movable cross-head mounted in said standard, a gage-wire connected with the front of said standards, and means for depressing said cross-head, substantially as shown and described.

4. A machine for trimming electrotype plates and blocks, consisting of a suitably-supported base-plate, a shaft mounted transversely of the top thereof and provided at one end with a circular saw, cross-bars mounted on said base-plate, a frame-supporting plate mounted on said cross-bars, a frame mounted on said last-named plate and adapted to slide thereon, said frame being provided at the opposite ends of the front thereof with upwardly-directed standards, a spring-supported vertically-movable cross-head mounted in said standards, a gage-wire connected with the front of said standards, and means for depressing said cross-head, and said frame-supporting plate being pivoted to the base-plate at one end, and said base-plate being also provided with means for raising and lowering the opposite end of said frame-plate, substantially as shown and described.

5. A machine for trimming electrotype plates and blocks, consisting of a suitably-supported base-plate, a shaft mounted transversely of the top thereof and provided at one end with a circular saw, cross-bars mounted on said base-plate, a frame-supporting plate mounted on said cross-bars, a frame mounted on said last-named plate and adapted to slide thereon, said frame being provided at the opposite ends of the front thereof with upwardly-directed standards, a spring-supported vertically-movable cross-head mounted in said standards, a gage-wire connected with the front of said standards, and means for depressing said cross-head, and said frame-supporting plate being pivoted to the base-plate at one end, and said base-plate being also provided with means for raising and lowering the opposite end of said frame-plate, and said cross-bars being projected in front of the machine, and provided with a supplemental plate, substantially as shown and described.

In testimony that I claim the foregoing as my invention I have signed my name, in presence of the subscribing witnesses, this 18th day of June, 1897.

WILLIAM CURTIS DALBEY.

Witnesses:
C. CHARLES RATHBUN,
FRANK B. HUNT.